(No Model.)
E. A. HOWE.
CHUCK.
No. 394,364.  Patented Dec. 11, 1888.
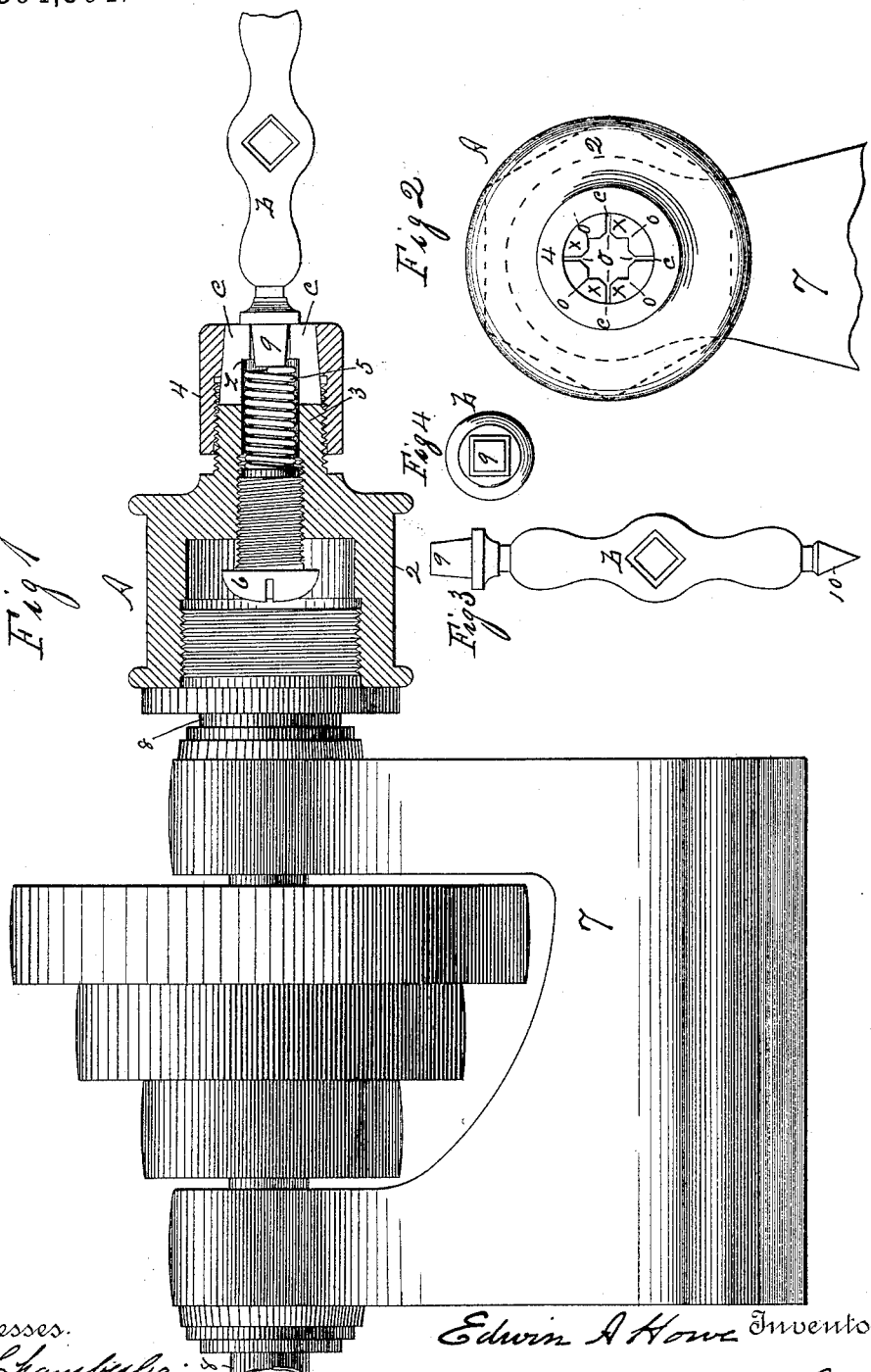

UNITED STATES PATENT OFFICE.

EDWIN A. HOWE, OF SPRINGFIELD, MASSACHUSETTS.

CHUCK.

SPECIFICATION forming part of Letters Patent No. 394,364, dated December 11, 1888.

Application filed September 13, 1888. Serial No. 285,333. (No model.)

*To all whom it may concern:*

Be it known that I, EDWIN A. HOWE, a citizen of the United States, residing at Springfield, in the county of Hampden and State of Massachusetts, have invented new and useful Improvements in Chucks, of which the following is a specification.

This invention relates to chucks for holding pieces of metal or wood for turning the same, the object being to provide an improved chuck to be used on a lathe, which is adapted by its peculiar construction to conveniently receive and hold one end of a piece of metal which is to be turned without stopping the rotary motion of the chuck for the purpose of inserting said piece therein or taking it therefrom after it shall have been operated upon; and the invention consists in the peculiar construction and arrangement of the several parts of the chuck, all as hereinafter fully described, and pointed out in the claims.

In the drawings forming part of this specification, Figure 1 is a longitudinal section of a chuck embodying my improvements and a side elevation of a head-stock and spindle of a lathe to which said chuck is applied, together with a portion of a metallic handle shown with one end engaged in said chuck. Fig. 2 is a front elevation of the chuck and of a portion of the end of the head-stock. Figs. 3 and 4 are respectively side and end views of said handle.

The essential purpose of this invention is to provide an improved chuck to be used in a lathe for the purpose of holding small metallic articles for the purpose of turning them, but more particularly for the purpose of holding a certain class of valve-handles to be turned which are ordinarily cast with an end projection thereon for engagement with the chuck, which is cut off after the piece is turned, said end projection being of rectangular form in cross-section to adapt it to enter a chuck-socket of like form. In practice, however, the said squared end of the handle cannot be inserted in a square chuck-socket without stopping the lathe to so insert it, thereby causing the loss of considerable time which might otherwise be profitably employed. I have discovered, however, that by making said chuck-socket of a peculiar form the said squared end of the handle can be easily inserted in said socket and easily withdrawn therefrom during the extremely rapid rotation of the lathe which is employed for turning and finishing like articles to said valve-handles, thereby greatly facilitating the turning and finishing of this class of work.

In the drawings, 7 indicates the head-stock of a lathe, and 8 the spindle thereof, one end of which is screw-threaded in the usual manner of constructing such spindles to provide for screwing a chuck thereon. The bed and the tail-stock of the lathe are not shown, those being parts of such a machine whose uses are well understood by persons skilled in the use of lathes and in turning metal pieces therein, so that any reference thereto will be sufficient to indicate their use in connection with any devices herein referred to.

A indicates the chuck, 2 being the body thereof, which is made hollow, as shown, and internally of cylindrical form, and having its external surface of hexagon or octagon form, as indicated in dotted lines in Fig. 2, to provide for applying a wrench thereto for screwing the chuck (which is internally screw-threaded at its rear end) onto the end of the spindle 8. The said chuck is made, preferably, from steel or similar metal possessing more or less flexibility in certain parts thereof, and has a nose, 3, extending from its forward end, which is bored through on a line with the axis of the chuck, first to form a socket in the extreme end of the nose for the reception of the end of an article or piece of metal which is to be held by the chuck while said article is being turned, and afterward the said perforation through the nose 3 and the adjoining forward end of the chuck-body 2 is counterbored from the rear end of the chuck toward the end of the nose to form a cylindrical chamber in said nose somewhat larger than the perforation in the extremity of the latter, whereby the shoulder z is formed.

That part of the body of the chuck adjoining the nose 3 has a screw, 6, fitted therein, and between the inner end of said screw and the said shoulder z in the nose is placed a coil-spring, 5, which, according to the position of said screw, is forced more or less against said shoulder, and thereby compressed to such degree as may be desirable for the purpose below set forth.

The extremity of the nose 3 of the chuck has several longitudinal slots, c, cut therein, preferably four, whereby the end of the nose is divided into four segmental sections, x, which constitute a series of more or less flexible arms, which at their extremities are capable of a movement toward and from the axis of the said socket therebetween, which receives the end of the article to be held by the chuck for turning. The said adjustment of the flexible segmental parts x of the nose of the chuck is not for the purpose of clamping the end of said article between said sections x, but to reduce the size of said socket, if need be, according to the size of the end of the piece, which is always loosely engaged therewith, as below set forth.

The outer surface of that portion of the nose 3 of a chuck adjoining the body 2 thereof is screw-threaded for the purpose of receiving one end of an internally-screw-threaded sleeve, 4, the opposite end of said sleeve being internally tapered and fitting around the correspondingly tapered and slotted end of the nose of the chuck, as shown in Fig. 1. The normal position of the sleeve 4 on the nose of the chuck is that shown in Fig. 1, whereby the segmental sections x thereof are permitted to retain their normal positions or those in which the opening therebetween is the greatest, and by screwing the sleeve 4 toward the body of the chuck the sections or arms x of the nose are contracted, as above set forth.

The said peculiar form of the chuck-socket which is employed in the chuck herein described consists in forming in the inner wall of said chuck-socket a series of angular recesses, o, as shown in Fig. 2, one of said recesses being formed in each of said segments or arms x and one being formed between the adjoining opposite edges of each section x, about one-half in each of the latter, as shown. The said receiving-socket, in other words, may be said to be at the outer end of the nose 3 of rectangular form in cross-section, having in each slotted wall one of said recesses o, the corners of the socket constituting the other of said recesses. The purpose of said side-recessed socket is to provide one in which the inner walls thereof have but very slight extent on either side thereof of surface on said rectangular lines thereof, thereby facilitating the entry and engagement of a piece in said socket while the chuck is rotating rapidly.

The above-referred-to valve-handle b is illustrated in side elevation in Fig. 3, and in Fig. 4 it is shown looking at the end thereof on which is the said projection 9, of rectangular form in cross-section, which is adapted to enter and engage with the recesses o of the said chuck-socket, as illustrated in Fig. 1, where said projection 9 is shown in operative position in the chuck, and when the handle or other piece is so placed to be turned the tail-stock spindle of the lathe is moved up against the opposite end of the handle, on which is a conical centering-piece, 10, which enters and is held in a suitable socket in the end of said tail-stock spindle. When the handle b is by said tail-stock spindle forced toward the chuck, (being at this time held between the fingers of the operator, while it rotates with the chuck until fully engaged by the tail-stock spindle,) the extreme end of the part 9 is forced against the adjoining end of the spring 5, thereby compressing the latter, and after the piece or handle shall have been turned and the tail-stock spindle is run backward to take the piece out of the lathe the spring 5 drives the turned handle out of the chuck, and thus prevents the end 9 from inconveniently being held thereby.

The nose 3 of the chuck is slotted, as aforesaid, and has the sleeve 4 screwing thereon only when the chuck is made to be used with pieces of varying size which are to be entered into the chuck-socket, as described, and when the chuck is made to be used for turning pieces having ends of uniform size to enter the chuck-socket the said adjustable features of construction, whereby said socket is made of variable size, are omitted. The said angular recesses o in the walls of the chuck-socket are arranged opposite each other and preferably consist of four pairs of sockets.

What I claim as my invention is—

1. A chuck for holding articles to be turned, having a receiving-socket for said articles therein, having the angular recesses o in the walls thereof, substantially as set forth.

2. A chuck for holding articles to be turned, having a receiving-socket for said articles therein, having the angular recesses o in the walls thereof, combined with the ejecting-spring 5 and the spring-regulating screw 6, substantially as set forth.

3. The chuck A, having the longitudinally-slotted nose 3, whereby the sections x surrounding the chuck-socket are formed, the angular recesses o in and between said sections, and the sleeve 4, screwing onto said nose, combined and operating substantially as set forth.

EDWIN A. HOWE.

Witnesses:
H. A. CHAPIN,
G. M. CHAMBERLAIN.